Feb. 27, 1968 J. PIOT 3,370,837
APPARATUS AND METHOD FOR CONTINUOUS MIXING OF GRANULAR
SOLIDS, POWDERS, LIQUIDS, OR GAS
Filed Nov. 30, 1965 6 Sheets-Sheet 2

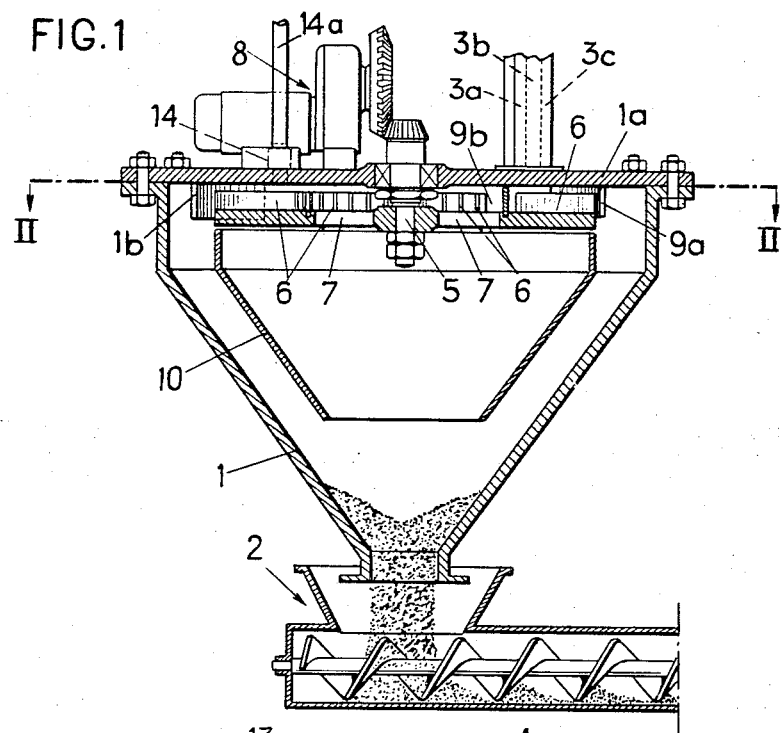
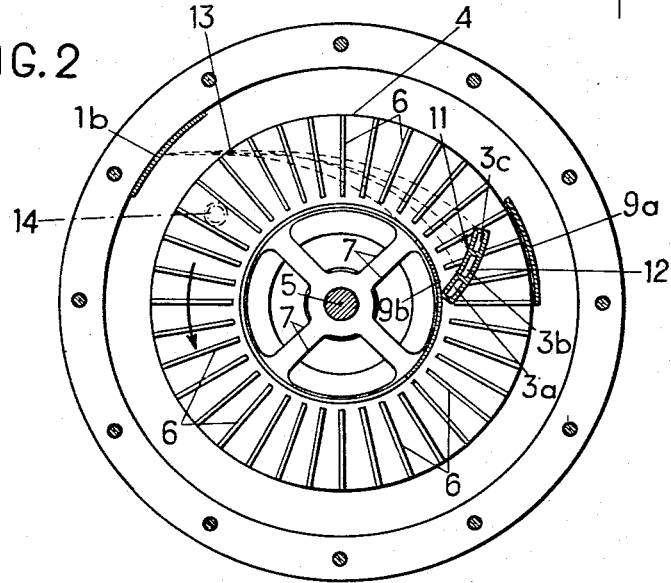

INVENTOR
JACQUES PIOT
By Hammond & Littell
ATTORNEYS

Feb. 27, 1968    J. PIOT    3,370,837
APPARATUS AND METHOD FOR CONTINUOUS MIXING OF GRANULAR
SOLIDS, POWDERS, LIQUIDS, OR GAS
Filed Nov. 30, 1965    6 Sheets-Sheet 4
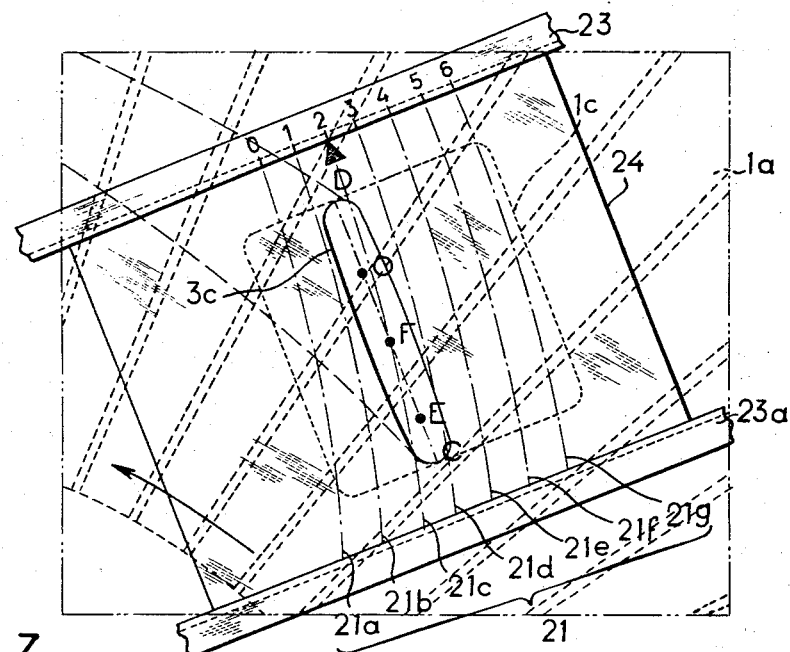
FIG.7
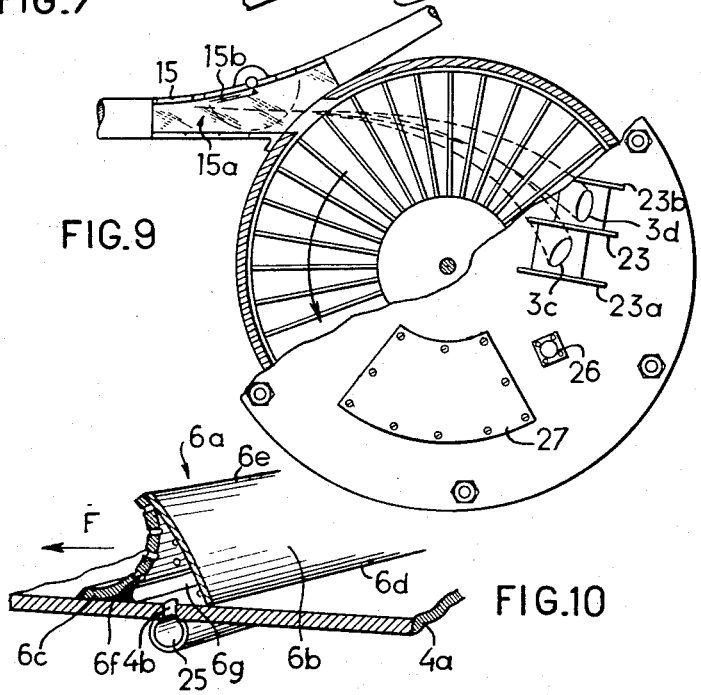
FIG.9
FIG.10
INVENTOR
JACQUES PIOT
By Hammond and Littell
ATTORNEYS Feb. 27, 1968  J. PIOT  3,370,837
APPARATUS AND METHOD FOR CONTINUOUS MIXING OF GRANULAR
SOLIDS, POWDERS, LIQUIDS, OR GAS
Filed Nov. 30, 1965  6 Sheets-Sheet 5
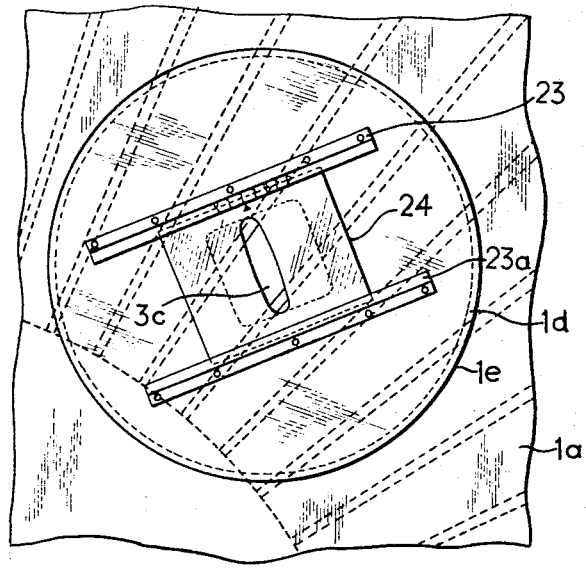
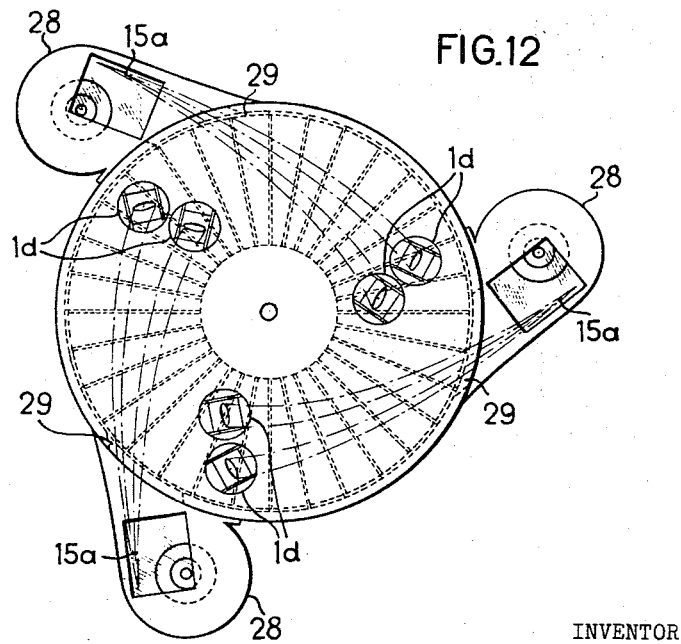
INVENTOR
JACQUES PIOT
ATTORNEYS

United States Patent Office 3,370,837
Patented Feb. 27, 1968

3,370,837
APPARATUS AND METHOD FOR CONTINUOUS MIXING OF GRANULAR SOLIDS, POWDERS, LIQUIDS, OR GAS
Jacques Piot, Paris, France, assignor to Stein & Roubaix, Paris, France, a corporation of France
Filed Nov. 30, 1965, Ser. No. 511,025
Claims priority, application France, Nov. 30, 1964, 996,825; Nov. 4, 1965, 37,309
15 Claims. (Cl. 259—8)

ABSTRACT OF THE DISCLOSURE

The present invention provides a mixer or emulsifier of instantaneous and continuous action using centrifugal force, characterised essentially by the fact that the various constituents of the mixture or the emulsion, solid materials in grain or powder form, liquids or gas, are introduced in such a manner as to make contact, in predetermined positions, with a rotating member carrying ribs in such a manner that the trajectories which these various constituents follow in the interior of the apparatus under the effect of the entrainment of rotation, are concurrent in a fixed point chosen on the periphery or beyond the periphery of the rotating member, intersect there at small angles, in such a manner that the assembly of the materials intimately mix at this point, the mixture thereby produced leaving the apparatus in the form of a narrow high-speed jet.

If one of the constituents of the mixture is air, the other material in the form of powder or grains, these two constituents, having been introduced as described above at suitably chosen positions, have at the position of ejection speeds which are very near each other in magnitude and direction, but are acquired independently, that is to say that the momentum which the material possesses was communicated to it entirely by the mechanical means of entrainment in rotation. The conditions for introducing a material into a pneumatic transport apparatus without turbulence are thus realised.

THE PRIOR ART

There are already known apparatuses for various uses which make use of the effect of centrifugal force for the projection of solid or liquid particles with, in certain cases, the air which they entrain onto a rotating member acting in the manner of a ventilator.

DESCRIPTION OF THE INVENTION

In a preferred embodiment of the invention, the entrainment of the constituents is ensured by a circular disc which turns about an axis and which carries reliefs, grooves, channels, undulations, ribs or fins for example, starting from an inner circle concentric with the plate and extending towards the periphery along a straight, radial or not, or curved line. The depth or the height of these reliefs may vary as a function of the distance from the axis of rotation. The constituents are brought to the chosen entry points by channels or conduits. A suitable flow rate through these channels or conduits may be obtained either by vibration or by other means, particularly aerated slideways or ventilators. It is evident that the axis of rotation may be vertical, horizontal or inclined, for it is possible to take into account the deformation of the trajectories of the materials caused by gravity.

The apparatus according to the invention is essentially based on the fact that if a fixed point of ejection is chosen on the periphery or beyond the periphery of the above-mentioned rotating disc, a curve fixed in space and lying in the plane containing the disc can be made to correspond to this point, such that any particle of matter, solid liquid or gas, making contact with the relief in the disc on a point of this fixed curve is driven outwards to the periphery to the previously chosen fixed point of ejection, and this, to a large extent, whatever the speed of rotation of the disc may be. If the various materials make contact with the disc in various points along an element of the said curve their trajectories are concurrent at the chosen fixed point of ejection; but moreover, the angles which these trajectories make at this point are small considering the length of the element of the curve used, in such a manner that an intimate mixture of the various materials take place instantaneously. In the case where one of the elements introduced is a gas, a suspension of the other materials in this gas is obtained; the jet which leaves the apparatus may then be admitted into a pneumatic transport apparatus.

In a practical embodiment of an apparatus according to the invention, the materials are introduced into the apparatus, not along a geometrical curve, but over a certain surface lying between two curves of the same family to which correspond, at the periphery of the rotating member, two different points of ejection. The jet, which would be theoretically a cone or small angle having its vertex at the point of ejection is in fact limited by straight lines making between them a small angle and starting from the periphery of a small area.

It is appropriate to point out that an apparatus in accordance with the invention, designed as a continuous operating mixer, ensures a high output while remaining comparatively simple. Moreover, with the provision of suitable supplying means, it may be formed by several discs mounted on the same axis. Furthermore, the instantaneousness of the mixture effected is particularly favourable to mixing operations in which one or several of the components are in small proportion.

Finally, if an apparatus in accordance with the invention delivers the product which it ejects into the circuit of a pneumatic transport apparatus, it presents from the point of view of operation, the advantage of supplying to the transported material its initial force by a purely mechanical means and thus without loss of energy caused by turbulence as is the case when the material, to start with, is introduced transversely to a moving air flow.

Moreover, various preferential embodiments permit the improvement of the operation of the apparatus in accordance with the invention. These improvements envisage particularly the position and the shape of the supply slots, control of the trajectories followed by the particles, maintaining the particles on the relief in the rotating disc or their radial sliding on the disc and along the relief, as well as the arrangements which must be presented by the inlet conduits for the products to ensure a sufficient and regular output through the delivery slots in the cover.

It is in fact established that, in order to arrange more easily the inlet conduits of the products to be mixed, it is advantageous that the point of convergence of the trajectories situate substantially beyond the periphery of the rotating disc. Moreover, different products introduced at the same point through the cover do not behave, after contact with the said disc in the same way; so as to give the apparatus a greater ease of use, it is therefore useful to provide each inlet orifice with an arrangement for adjusting the trajectories. Moreover, to enable the inlet slots to be given widths permitting large throughputs, each inlet orifice should be provided with an adjustment device permitting the fan of trajectories which leave it to be closed up again, and also with shapes and dimensions for the conduits capable of bringing the product to the orifice in the form of a regular rapid flow. Finally, in accordance with the throughput and the product in question, the fins or reliefs should present shapes or arrangements preventing it from escaping from their entraining action or facilitating its radial sliding, up to the ejection which may usefully take place in some cases in a scroll connected to a cyclone integral with the mixer.

Preferred embodiments incorporate the following points taken separately or in the various possible combinations:

—The inlet orifices present a certain spacing while remaining on the curves of introduction determined by calculation;

—The inlet orifices consist of slots formed in plates, each plate comprising a slot, and being capable of sliding in slideways situated on the cover of the mixer, on each side of a window, particularly of rectangular shape provided in the said cover, this arrangement permitting each slot to be given, in accordance with the product in use, the suitable position;

—A device is provided consisting in an assembly of compartments mounted on the body of the mixer serving, by means of gauges introduced into one or several orifices, to determine for each product a coefficient permitting the adjustment of the inlet orifice;

—An opening is formed in the cover of the apparatus above the zone of ejection and of convergence of the trajectories, for example on the upper plane of junction with the conduit of a pneumatic transporter or the upper lane of a scroll connected to a cyclone, this opening being blocked by a transparent plate permitting the trajectories of the particles in the zone of ejection to be followed visually, cleaning means for the plate being provided at its internal face;

—Rotating discs are incorporated in the cover of the mixer comprising the above-mentioned device, associated with a window formed in each rotating plate is a small plate presenting an inlet window, the guiding slideways of the small plate being fixed to the said rotating plate, the orientation of rotating plate permitting adjustment of the axis of the slot relative to theoretical curves for the introduction of a product introduced into the mixer;

—The fins of the disc present an internal hollow preferably of substantially triangular form, the base being provided by the disc itself and the face driving the product being of more or less incurved shape presenting porosities or fine holes;

—A circulation of compressed air is ensured in the interior of the above-mentioned fins to dislodge particles which may adhere to the curved face of the fins;

—A cover in accordance with the invention comprises moreover one or several orifices permitting the introduction of the lubricant intended to facilitate the sliding of the products and to reduce the wear of the fins and of the disc, a sector of this cover being easily removable for cleaning the fins;

—A scroll is disposed in such a manner as to surround the point of ejection and to guide the mixture ejected into a cyclone integral with the mixer;

—The inlet conduits for the product, or suitable inclination, present internal sidewalls which are perfectly smooth and may be fixed to the small adjustment plates carrying the inlet slots for the product;

—A valve is provided in the interior of these conduits to avoid the inlet of air in the interior of the apparatus.

Embodiments of the invention will now be described by way of example with reference to the accompanying drawings, in which:

FIG. 1 is an axial sectional view of a mixer in accordance with the invention;

FIG. 2 is a plan view on the line II—II of the mixer of FIG. 1;

FIG. 7 shows another embodiment on an enlarged scale of the means for introducing the particles;

FIG. 9 represents, in another embodiment, a plan view with the cover partly broken away, of a device for controlling the trajectories different from that shown in FIG. 8;

FIG. 10 shows in section and in perspective a fin of the disc in another embodiment;

FIG. 11 is a plan view of the device of FIG. 7 mounted on a rotating plate incorporated in the cover;

FIG. 12 is a plan view of an embodiment of a mixer according to the invention joined by scrolls to a cyclone.

Figure 3:
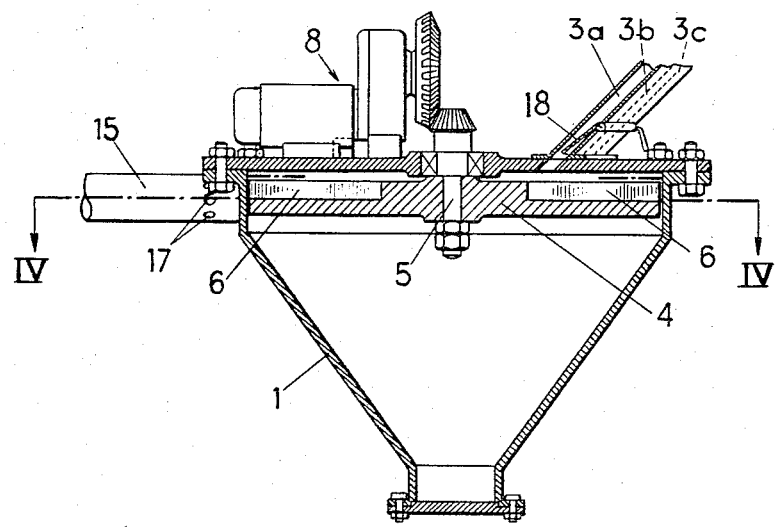
FIG. 3 is an axial sectional view of a modification of the embodiment of FIG. 1 intended to serve as the starting point for a pneumatic transporter.

Referring to the drawings, particularly FIGURE 1, it will be seen there is indicated by 1, the body of the mixer which is in the form of a cone having its vertex pointing downwards. This cone forming a hopper is disposed above an archimedean screw transporter 2 which permits the removal of the mixed products. The products to be mixed arrive in the apparatus through the chutes 3a, 3b, 3c which are fixed on the cover 1a which covers the body 1 of the mixer. It is worth noting that the apparatus does not include any entry for external air.

A circular disc 4 rotating about an axis 5 is disposed just below the cover 1a. It carries a radial fin 6 and its central portion is formed by crossed bars leaving openings 7. The axle 5 is rotationally driven by a motor and reduction gear indicated at 8 as an assembly.

At the level of the chutes 3a, 3b, 3c on the lower portion of the cover 1a, there are disposed two deflectors 9a, 9b, the section of which is an arc of a circle, one of these deflectors 9a being situated along the external circumference of the disc 4, and the other along its internal circumference. The deflector 9b is engaged in a circular groove formed in the rotating disc. Below the disc 4 is disposed a cone 10.

When different solid products are introduced by the chutes 3a, 3b, 3c, the particles fall onto the disc 4 which is rotationally driven by the motor and reduction gear 8, between two limiting curves indicated by 11 and 12 in FIG. 2. These particles are driven by the disc 4 as a result of the fins 6 and their trajectories converge towards a zone 13 of the external circumference of the disc 4; the width of this zone 13 depends essentially on the mean distance which separates the curves 11 and 12. The mass of particles which converge at 13 is then ejected from the disc 4 and strikes the body 1 of the mixer in its reinforced zone 1b, this zone being placed near the zone 13. The particles ejected from the disc 4 then fall in a homogeneous mixture into the zone lying between the two cones 1 and 10 and the mixture collects at the bottom of the cone 1, which forms a hopper, to be removed by the screw-transporter 2.

Bearing in mind that the solid particles supplied by the chutes 3a, 3b, 3c, fall on the disc 4 with zero circumferential speed, it is necessary that the disc 4 carries elements permitting the particles to be entrained; this is the purpose of the radial fins 6. However, so that the particles follow the trajectories provided in the apparatus, it may be necessary that, in the zone of their introduction, they are protected from possible internal air draughts caused by the rotation of the disc 4 the fins of which act in the manner of a ventilator. For this reason, the inlet zone is enclosed by the two protective deflectors 9a and 9b.

For the case where an accidental excess pressure should be generated in the interior of the apparatus, as a result of accidental inlet of air, a safety valve 14 is provided and is carried by the cover 1a, this valve discharging into a pipe 14a.

Figure 4:
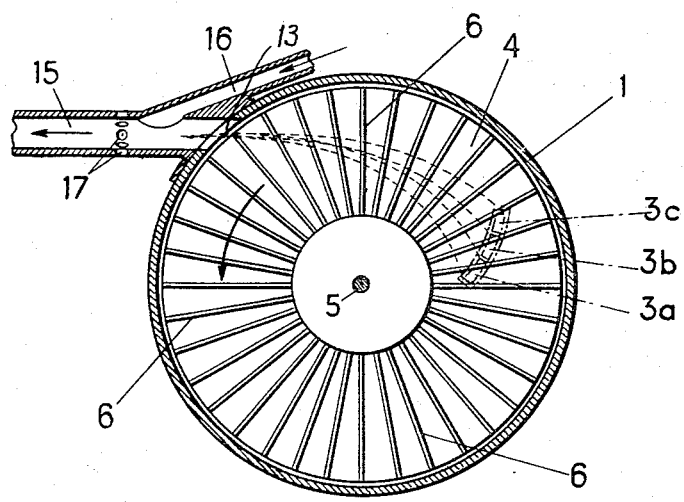
FIG. 4 is a plan view in section along the line IV—IV of FIG. 3.

In a modification of this apparatus, the features of the apparatus described above are used to form the starting point for a pneumatic transporter which is to move a mixture of solids or even a single solid. This embodiment is shown in FIGS. 3 and 4.

In this apparatus, two solids are brought in in the divided state through the chutes 3a and 3c, and entry of air into the apparatus takes place through the chute 3b which is left free. The body of the apparatus is indicated by 1 and the rotating disc contained therein and driven as in the preceding case by a pin 5 driven by means of a motor and reduction gear 8 is indicated by 4. The disc 4 carries as previously radial fins 6.

In the zone 13 of the body 1 of the apparatus where the particles introduced into the apparatus are ejected, is an output pipe indicated by 15; the axis of this pipe is directed along the mean direction of ejection of the particles. The pipe 15 comprises at its point of connection with the body 1 an inlet 16 for auxiliary air. Moreover, over a certain distance from the point of connection, the pipe 15 comprises lateral air inlets 17.

When the disc 4 is set in rotation, the particles introduced through the chutes 3a and 3c and the air there which arrives through the chute 3b, follow in the interior of the apparatus trajectories which bring them all into the ejection zone 13 and they form a narrow bunch the axis of which coincides with the axis of the pipe 15. As a result of this arrangement a mixture of solid particles in suspension in the air blows into the pipe 15.

It should be pointed out that in this embodiment the disc 4 has a solid centre, the openings 7 of the device of FIGS. 1 and 2 being no longer necessary since the air, which enters through the chute 3b escapes through the pipe 15. The conical shape of the body 1 of the apparatus has only the purpose of collecting if necessary at the bottom of the cone the solid particles ejected from the disc 4 which struck against the sidewall 1 instead of entering the pipe 15. The solid suspension which arrives in the pipe 15 is drawn off by the pneumatic transporter of which the pipe 15 forms the starting point, but it should be pointed out that the ease of the displacement can be increased by bringing in through the oblique union 16 a certain amount of compressed air.

If on the one hand the quantity of air admitted through the pipe 15 is sufficient and if, on the other hand, the pressure and the speed of ejection are also sufficient, the jet of solid suspension is simply admitted into the pipework of the pneumaitc transport system without adding secondary air. If the pneumatic transport installation envisaged requires supplementary air to be supplied, this can be done either by means of the oblique pipe junction 16 or by a ring of openings 17 pierced obliquely into the pipe 15; this latter solution presents the advantage of promoting the formation of a sleeve of air not charged with material around the jet. As circumstances demand, the oblique pipe junction 16 or the ring of openings 17 can be used. It is obvious that the pipe 15 which receives the jet may lead the product directly into a cyclone of conventional type situated near the mixer described.

It is also obvious that the chutes 3a, 3b, 3c may be provided with any desirable means to modify during operation the proportion of the products which are mixed by means of the apparatus according to the invention. In particular, adjustable shutters such as the shutters 18 represented in FIG. 3 can be arranged, these shutters being capable of adjusting the cross-section of the chutes in the zone of entry of the materials into the apparatus.

Figure 5:
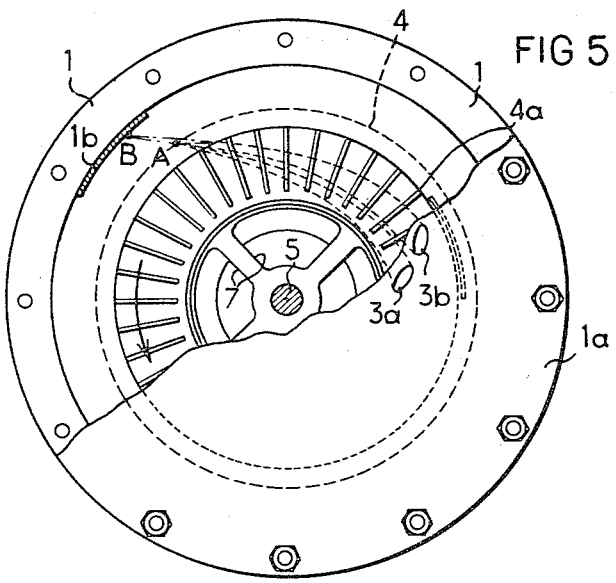
FIG. 5 shows a plan view of an embodiment similar to FIG. 1, including a preferred improvement.

FIG. 5 shows an embodiment similar to that of FIG. 1 but presenting a feature which is preferably adopted.

In a mixer intended from the start to be equipped with a circular disc 4 represented in broken lines, there is mounted a disc 4a of the same construction as the disc 4 but of smaller diameter chosen such that the particles introduced through the orifices 3a and 3b nevertheless converge in the same reinforced zone 1b of the body 1 of the mixer.

Figure 6:
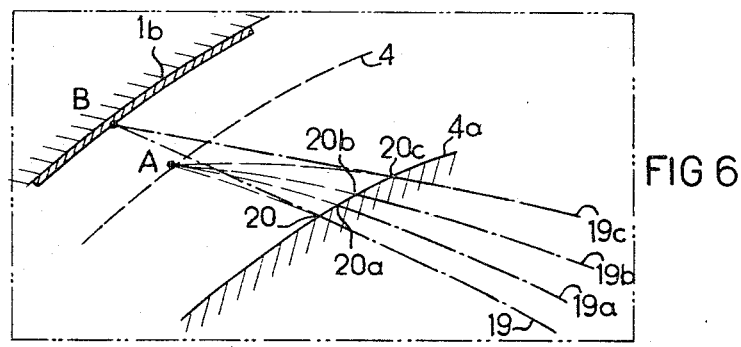
FIG. 6 is a view on a larger scale of the ejection zone of the particles represented in FIG. 5.

In FIG. 6 are represented the extreme curves 19 and 19a on the one hand and 19b and 19c on the other hand representing the zone of the trajectories of the particles introduced through the orifices 3a and 3b.

In the emobdiment of FIG. 1, these curves intersect at the point A situated at the periphery of a disc such as the original disc 4, but when the particles reach the point 20, 20a, 20b, 20c in which they leave the disc they continue their displacement along the tangent to their trajectory in these points in order to converge at a small angle at the point B situated on the reinforced zone 1b of the body of the mixer.

An apparatus according to this embodiment presenting a disc such as 4a is thus less heavy and cumbersome than the apparatus shown in FIG. 1 while performing the identical work. The extreme trajectories followed by the particles to be mixed may be spaced further apart as long as the products are on the disc. On the other hand, with equal disc diameter, the inlet slots 3a, 3b may be more distant from each other, which facilitates the positioning of the supply means. Moreover, this embodiment presents the feature of permitting the particles entering the mixture to be liberated at a lower speed than in the case of a mixer equipped with a disc according to FIG. 1.

Different products do not have the same coefficient of friction during their movement on the disc and against the fins or reliefs. It results that if different products are introduced through the same slot situated at right angles to a predetermined entry curve, the points of projection are different.

To permit the use of the apparatus with various materials and also to improve, by adjustment at each inlet orifice; the convergence of the trajectories of the products to be mixed, a family of entry curves corresponding to the same chosen point of convergence have been determined, each curve being established for a value of the coefficient of friction. This family of curves 21 is shown on FIG. 7 by the tracing of some of them such as 21a, 21b, 21c, 21d, 21e, 21f and 21g.

The coefficient of friction being variable with the radial speed of the product and the friction depending not only on the weight of the product but also on the pressure against the fins or reliefs which is variable itself also as a function of the speed, it has been necessary to adopt for calculation purposes a coefficient which takes account of a certain mean friction effect.

The value of this relative coefficient being known for a particular product, to obtain the convergence of the trajectories at the chosen point it is sufficient to displace the slot in such a manner as to superpose its axis on the curve of the family which corresponds to this coefficient. The relative displacement of the entry slots has been easily effected as shown in FIG. 7. In the cover 1a of the mixer is formed a window 1c of substantially rectangular shape having one of its dimensions slightly greater than the length of the slot C–D. On each side of this window are disposed graduated slideways 23 and 23a and between these slideways a sliding plate 24 presenting an opening such as the slot 3c previously considered.

Figure 8:
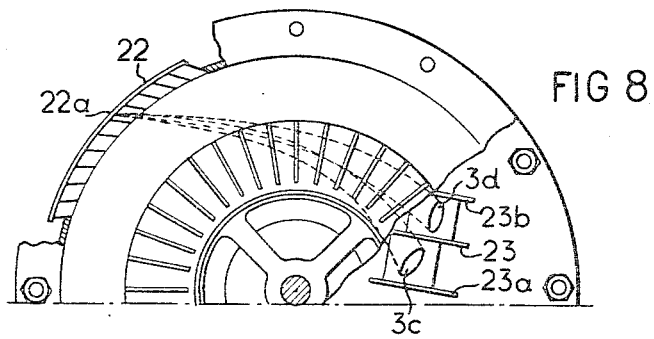
FIG. 8 shows another embodiment in plan view with the cover partly broken away of the means for controlling the trajectories.

In the ejection zone of the particles at the periphery of the body of a mixer in accordance with the invention and shown in FIG. 8 is formed an opening on which is fixed a pocket-holder 22 forming a belt and comprising a number of pockets 22a. Samples of the products are introduced into the openings 3c and 3d having a position determined on the cover and they are collected in the pockets such as 22a. Comparison of the number of the pocket with the number of the graduation corresponding to the position of the inlet slot enables the coefficient to be adopted for each product to be determined and for each operational set-up of the apparatus. As the devices for mixing from the entry up to the ejection only occupy a limited sector of the cover, in a remaining free portion of the latter there may be provided a sector devoted to the measure of the coefficient in question by piercing in the cover one or several orifices of fixed position and disposing the pocket holder 22 mentioned above in the zone of ejection corresponding to these orifices.

Another arrangement permitting the visual control of the trajectories may be adopted; either necessarily when to obtain a higher output the mixing arrangements are repeated in two or three sectors of the cover disc, or when at the point of ejection the casing of the mixer is provided with a conduit permitting the trajectories to be prolonged over a certain distance beyond the periphery, which is the case when the ejection is connected to a pneumatic transporter or even takes place into a scroll itself connected to a cyclone. FIG. 9 shows the arrangement corresponding to the introduction of the mixture into a conduit of a pneumatic transporter. In the pipe 15 is formed a window which is provided with a transparent plate 15a as well as an associated illumination window not shown in the drawing. The operator displaces the slots 3c and 3d in their slideways 23, 23a and 23b so that the trajectories converge well into a zone approximately situated on the axis of the pipe, a wiper 15b operated from the exterior permits the cleaning of the internal face of the glass.

It has been explained above that a product introduced into the mixer by one slot of a certain width disposed according to an entry curve theoretically formed at the moment of ejection a bunch instead of all the trajectories being concurrent at the same point. This bunch is the larger as the slot itself is larger. The arrangement described below and shown in FIG. 7 enables narrow bunches to be obtained while giving to the slots widths avoiding jamming of the product with a high throughput. It will be observed that if the axis of the slot instead of being disposed exactly along a theoretical entry curve makes with this curve a certain angle as is indicated in FIG. 7 and if one considers the particles sliding along the same fin, those which fall into the region E tend to move radially more quickly than those which form the region F and the particles falling at G will be on the contrary slower. As a result, along the fin there occurs a heaping-up on each side of the particles which have fallen at F, in such a manner that the bunch of the trajectories will be compressed towards the trajectory corresponding to the point of fall F, the centroid of the slot.

The means for adjusting the angle of the axis of the slot with the outline of the theoretical curve for the introduction of the product is shown in FIG. 11. The window 3c instead of being formed in the cover 1a is formed in a rotatable plate 1d located in a corresponding opening 1e in the cover. This rotatable plate also shown in FIG. 13 carries the slideways 23 and 23a between which slides the slot-carrying plate 24. It is capable of turning, taking with it the inlet means, which permits the axis of the inlet slot to be conveniently adjusted relative to the outline of the theoretical supply curves.

For certain uses of the mixer according to the invention it has been stated that it is necessary to facilitate the sliding of the particles along the fins. For this purpose, fins 6a such as are shown in FIG. 10 have been designed presenting two faces: one face 6b formed by a plate not pierced with orifices, nor porous, resting on the disc 4a by an edge 6d and the other face 6c which may be curved, connecting the second edge 6e of the above-mentioned face 6b to the disc 4a. Air under pressure may pass through the face 6c either because it is porous or because it is pierced with small holes such as 6f. Between the two faces of the fin circulates air under pressure supplied by a conduit 25 through orifices such as 4b. This arrangement of the fins permits the creation of a layer of air between the fin and the product which facilitates the sliding of the latter.

To facilitate the sliding of certain products or to avoid wear of the rotating disc and of the fins, it may also be appropriate to provide a lubricant which may be introduced by an orifice 26 shown in FIG. 9 through the cover 1a. The lubricant which has fallen on the rotating disc is spread out by the effect of centrifugal force. To permit periodic cleaning of the fins, a trap-door 27 shown in FIG. 9 is provided in the cover 1a.

It has been found useful in certain cases to incorporate in the same apparatus the cyclone which is to receive the mixture after ejection. In this case, a scroll guiding the mixture towards the cyclone surrounds the zone of ejection.

FIG. 12 shows a mixer according to the invention the cover of which has been provided with inlet means divided into three equally spaced groups, each group comprising two devices 1d according to FIG. 11. At each of these groups is annexed a scroll 28 fixedly mounted on the body of the mixer after having formed therein an opening 29 as mentioned previously for mounting the pocket holder 22 of FIG. 8, the mixed particles being ejected in a bunch of trajectories through these openings 29 as shown in broken lines in FIG. 12. These scrolls 28, three in number, are connected by appropriate casings to a cyclone not shown in the drawing which receives the mixed particles.

On these scrolls are provided at the upper part windows comprising transparent plates 15a permitting the visual inspection of the bunches of the trajectories of the ejected particles having a role similar to that of the plates 15a shown in FIG. 9 relating to the use of the mixer for the introduction of the mixed particles into the inlet of a pneumatic transporter.

Through the inlet slots for the various products to be mixed, the width of the slots being inevitably limited, it may be necessary to pass considerable throughputs. It is therefore indispensable that the product, on arriving at its inlet slot has a sufficient speed and that, on the other hand, it falls not as a shower but as a relatively compact flow. Each chute introducing a product should therefore be inclined and not vertical and its slope should be sufficient for the product to slide as a rapid sheet on the bottom of the chute.

On the other hand, as the slot formed in the members of adjustable position is movable, the chute which is connected to it must itself be connected to the transporter which supplies the product by a flexible and articulated system.

Finally, since to avoid blockages the section of the chute and that of the slot must not be fully used by the product, a flow of air must be capable of being established in the chute and this flow will become mixed with ejected product. In the case where it is desirable to avoid this introduction of air or to limit it, a valve may be disposed at a point in the chute, for example a light counterweighted valve bearing on the layer itself of the product sliding on the bottom of the chute.

Figure 13:
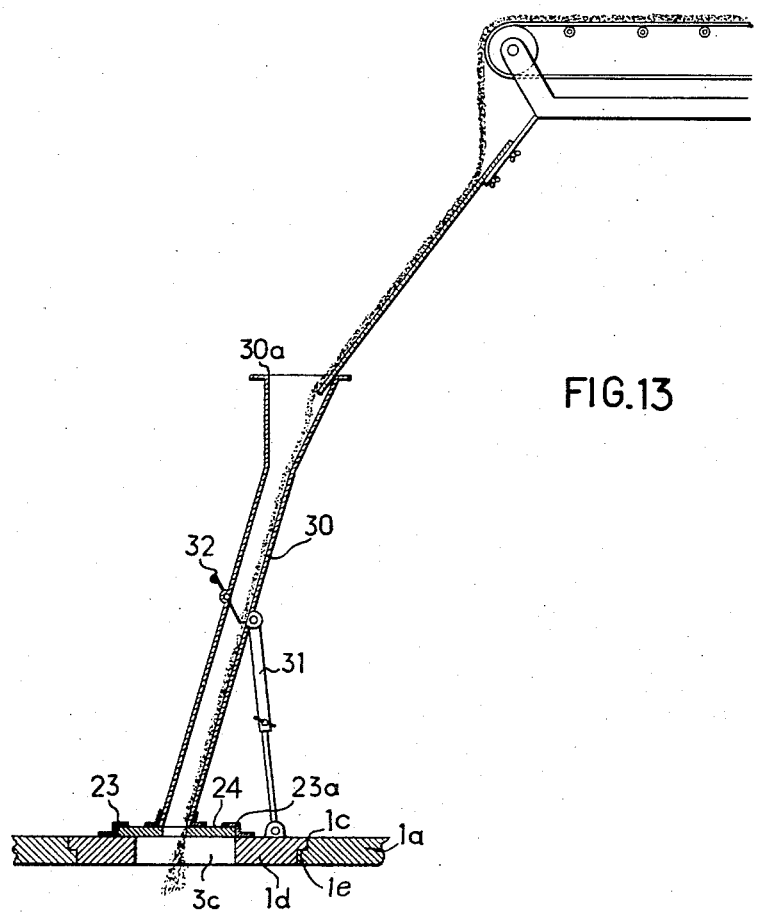
FIG. 13 is a diametrical vertical section of an inlet chute mounted on the rotating plate shown in FIG. 11 with means for supplying this chute.

For this purpose, on a rotatable plate 1d in accordance with the device of FIG. 11, shown in section in FIG. 13, this plate 1d resting in a circular seating 1e with a shoulder formed in the cover 1a there is fixed by any appropriate means, an inclined chute 30. This chute comprises a widened entry 30a to facilitate its connection with the aid of a flexible connector to the supply device for the products to be mixed, as is shown in FIG. 13; in particular a belt transporter. An adjustable support 31 bearing on the rotatable plate 1d and connected at its other end to the chute 30 maintains the latter at the desired inclination, the counterweighted valve 32 serving as a regulator for the flow of the products entering the apparatus.

Obviously the embodiments described above do not present any limiting character and may receive any desirable modifications, without in any way departing from the scope of the invention in particular the curved element of the fins may be formed by a longitudinally-cut portion of tube.

Similarly the mixture or mixtures produced by means of a rotating disc such as described above may be passed onto a second disc, advantageously mounted on the same shaft, where they are mixed with one or more constituents, and so on.

I claim:
1. A method of continuously mixing flowable materials having varied densities, comprising the steps of:
   (a) continuously directing said materials separately from stationary inlet positions onto a rotating ribbed surface, said inlet positions being chosen such that on contacting said surface said separate materials are impelled to follow trajectories depending on the density of said separate materials and converging at small angles to substantially intersect each other in a stationary mixing region, and
   (b) continuously removing the mixture of said materials from said mixing region.
2. A mixer for continuously mixing flowable materials having varied densities, comprising:
   (a) a rotatable member, said rotatable member presenting a ribbed surface,
   (b) bearing means rotatably mounting said rotatable member,
   (c) driving means for rotatably driving said rotatable member,
   (d) separate inlet means for continuously directing said materials separately onto said ribbed surface, said inlet means being so positioned that on contacting said ribbed surface said separate materials are impelled to follow trajectories depending on the density of said separate materials and converging at small angles to substantially intersect each other in a stationary mixing region, and
   (e) means for continuously removing the mixture of said materials from said mixing region.
3. A mixer according to claim 2, in which said separate inlet means comprises a plurality of chutes, one for each of said separate materials, said chutes being disposed side by side in predetermined positions relative to said mixing zone.

4. A mixer according to claim 2, in which said ribs are radial.
5. A mixer according to claim 2, in which said means for continuously removing said mixture include an outlet conduit and means for blowing compressed air obliquely into said conduit.
6. A mixer according to claim 2, and including deflectors adjacent said rotating member, one said deflector being radially inwardly of said inlet means and another said deflector being radially outwardly of said inlet means.
7. A mixer according to claim 2, in which said radial ribs are formed with fins, said fins having a hollow interior and the material engaging faces of said fins being provided with air supply means to prevent adhesion of said materials to said faces.
8. A mixer according to claim 7, in which said air supply means discharge air through said faces.
9. A mixer according to claim 2, in which said inlet means include delivery slots.
10. A mixer according to claim 9, in which said delivery slots are adjustable both translationally and rotationally relative to the plane of said rotatable member.
11. A mixer according to claim 10, in which said delivery slots are formed in plates slidably mounted in stationary slideways.
12. A mixer according to claim 11, in which said slideways are mounted on angularly adjustable turntables.
13. A mixer according to claim 12, in which inclined feed chutes for the materials to be mixed are mounted on said turntables.
14. A mixer according to claim 13, and including a flap-valve in the interior of each said chute to limit the entry of air into the mixer.
15. A mixer according to claim 2 and including a housing enclosing said rotatable member, and a scroll enclosing said mixing region, said scroll being adapted to guide said mixture away from said mixing region.

References Cited
UNITED STATES PATENTS 3,163,402   12/1964   Yamashita _____ 259—8 XR WALTER A. SCHEEL, *Primary Examiner.*

J. M. BELL, *Assistant Examiner.*